United States Patent [19]

Suzuyama et al.

[11] Patent Number: 5,045,968

[45] Date of Patent: Sep. 3, 1991

[54] GAS INSULATED SWITCHGEAR WITH BUS-SECTION-UNIT CIRCUIT BREAKER AND DISCONNECT SWITCHES CONNECTED TO EXTERNAL LEAD-OUT MEANS CONNECTABLE TO OTHER GAS INSULATED SWITCHGEAR

[75] Inventors: Hiroshi Suzuyama, Hitachi; Yoshirou Suzuki, Kuji; Takehiro Kikuchi; Minoru Sakaguchi, both of Hitachi, all of Japan

[73] Assignee: Hitachi, Ltd., Tokyo, Japan

[21] Appl. No.: 321,102

[22] Filed: Mar. 9, 1989

[30] Foreign Application Priority Data

Mar. 11, 1988 [JP] Japan ................................. 63-56109

[51] Int. Cl.$^5$ .......................... H02B 7/01; H02B 5/06; H02B 1/20
[52] U.S. Cl. ..................................... 361/335; 361/333; 361/341
[58] Field of Search ................ 361/333, 335, 341, 332, 361/361, 363

[56] References Cited

U.S. PATENT DOCUMENTS

| | | | |
|---|---|---|---|
| 1,920,683 | 1/1933 | Edsall | 361/333 |
| 3,235,774 | 2/1966 | Frowein | 361/335 |
| 3,378,731 | 4/1968 | Whitehead | 361/333 |
| 3,405,325 | 10/1968 | Brückner et al. | 361/333 |
| 3,823,346 | 7/1974 | Olsen | 361/341 |
| 3,917,985 | 11/1975 | Finley | 361/332 |
| 3,930,188 | 12/1975 | Olsen et al. | 361/335 |
| 4,032,820 | 6/1977 | Oishi et al. | 361/333 |
| 4,209,821 | 6/1980 | Kobayashi et al. | 361/341 |
| 4,237,520 | 12/1980 | Oishi et al. | 361/335 |
| 4,493,009 | 1/1985 | Lorenz et al. | 361/341 |
| 4,503,481 | 3/1985 | Fujiya et al. | 361/341 |
| 4,577,826 | 3/1986 | Bergström et al. | 361/333 X |
| 4,638,403 | 1/1987 | Amano et al. | 361/341 |
| 4,651,255 | 3/1987 | Suzuyama et al. | 361/341 |
| 4,745,522 | 5/1988 | Mitomo et al. | 361/333 |
| 4,752,860 | 6/1988 | Romanet et al. | 361/333 |
| 4,821,141 | 4/1989 | Torimi et al. | 361/341 |
| 4,829,400 | 5/1989 | Enomoto | 361/341 |
| 4,837,662 | 6/1989 | Takeuchi et al. | 361/335 |
| 4,862,319 | 8/1989 | Suzuyama et al. | 361/341 |
| 4,866,569 | 9/1989 | Okumura et al. | 361/355 |

FOREIGN PATENT DOCUMENTS 56-80616 6/1981 Japan.
58-116006 7/1983 Japan.

OTHER PUBLICATIONS

"Denki Kyodo Kenkyu," Joint Electrical Research Group Third Edition, No. 8, vol. 41, No. 5, pp. 67-68, Feb. 1989.

*Primary Examiner*—Leo P. Picard
*Assistant Examiner*—Michael W. Phillips
*Attorney, Agent, or Firm*—Antonelli, Terry, Stout & Kraus

[57] ABSTRACT

In a gas insulated switchgear equipment device, at least one gas insulated main bus bar is arranged on an attachment surface and a plurality of feeder units each having one end connected to the gas insulated main bus bar and the other end connected to an insulating terminal are arranged along a longitudinal direction of the gas insulated main bus bar, thereby constituting a substation equipment device. A gas insulated bus-section-unit is arranged on a portion of the gas insulated main bus bar and has at least a circuit breaker and disconnecting switches connected to both ends of the circuit breaker, and one end of the bus-section-unit is connected to the corresponding gas insulated main bus bar and the other end of the bus-section-unit is provided with at least one external lead-out device connectable to an external connecting device. With this arrangement, by the use of the bus-section-unit arranged on the portion of the gas insulated main bus bar, the substation equipment separated or increased can be easily interconnected or renewed.

33 Claims, 14 Drawing Sheets

GAS INSULATED SWITCHGEAR WITH BUS-SECTION-UNIT CIRCUIT BREAKER AND DISCONNECT SWITCHES CONNECTED TO EXTERNAL LEAD-OUT MEANS CONNECTABLE TO OTHER GAS INSULATED SWITCHGEAR

BACKGROUND OF THE INVENTION

1. Field of the Invention

The present invention relates to a gas insulated switchgear equipment device, and more particularly, to a gas insulated switchgear equipment device adapted for electrically interconnecting a plurality of gas insulated switchgear systems installed independently in a substation.

2. Description of the Prior Art

Substations have been run on a more extensive scale according to an increase in electric power demand. Generally, in the structure of a substation, to improve the reliability of the system, a technique wherein a main bus bar is constructed in a dual form or is separated in two so as to be operated independently and a bus-section-unit is provided for interconnecting two main bus bars, or a bus-tie-unit is provided for interconnecting both main bus bars arranged in parallel and a feeder unit is connected between the dual main bus bars has been proposed, as disclosed in the Japanese literature "Denki Kyodo Kenkyu" (Vol. 41, No. 5, pages 67–68), and in the Japanese Utility Model Unexamined Publication No. 56-80616.

The above-mentioned known structure of the substation will be further explained with reference to the circuit diagram of FIG. 19 showing a schematic structure of the substation with single wire. A first main bus bar 1 and second main bus bars 2A, 2B are designed to be a dual parallel main bus bar construction wherein the main bus bars 2A and 2B are arranged coaxially with each other and are separably connected by a bus-section-unit S. The bus-section-unit S comprises a disconnecting switch 3a connected, at one end, to the main bus bar 2A, a disconnecting switch 3b connected, at its one end, to the main bus bar 2B and a circuit breaker 4 for interconnecting these disconnecting switches. Further, the main bus bar 1 and the main bus bar 2A or 2B which are arranged in parallel are separably connected by a bus-tie-unit T so that the electric power can be transmitted between these main bus bars, and the main bus bars 1, 2A or the main bus bars 1, 2B are separably connected to a feeder unit F which leads to a transformer or other loads.

With this wiring arrangement, for example, in the inspection or failure of the main us bar 2B connected to the bus-section-unit S, by operating the circuit breaker 4 and opening the disconnecting switches 3a, 3b, and also by operating the bus-tie-section T, the remaining main bus bars 1 and 2A can be used as they are.

In the above-mentioned structure of the substation, examples wherein gas insulated switchgear equipment is used as the bus-section-units are disclosed, for example, in the above-mentioned Japanese Utility Model Unexamined Publication No. 56-80616 and the Japanese Patent Unexamined Publication No. 58-116006. According to these examples, in order to interconnect each of the gas insulated main bus bars separately aligned on the same axis on an attachment surface, there is provided an arrangement wherein an auxiliary gas insulated bus bar is arranged at a side of the opposed ends of the gas insulated main bus bars to interconnect them, or an arrangement wherein an auxiliary gas insulated bus bar is arranged above the gas insulated main bus bars to interconnect the latter. It should be noted that the above-mentioned examples can be realized only in the case where the separated main bus bars are aligned with each other.

In general, the substation properly has gas insulated switchgear equipment units for a plurality of circuits according to a condition of the installation site and/or an initial installation specification. When there is a restriction in the installation site so that all of the gas insulated switchgear equipment devices cannot be installed in the direction of the axes of the main bus bars, it is necessary that the gas insulated switchgear equipment units are divided into two or more sections to be installed separately and these unit sections are interconnected. Further, when the existing substation capacity becomes insufficient due to the increase in electric power demand, it is necessary for other gas insulated switchgear equipment devices to be installed and for such equipment devices to be interconnected. In either case, it must be considered to easily carry out the electrical connection between the transformer elements such as the gas insulated switchgear equipment devices and the like separately installed in the substation and to reduce the installation time in the increase of other gas insulated switchgear equipment devices.

SUMMARY OF THE INVENTION

An object of the present invention is to provide a gas insulated switchgear device of which electrical elements can be separately installed and which can easily interconnect the electrical elements of the gas insulated switchgear device separately installed in a substation.

Another object of the present invention is to provide a gas insulated switchgear device which can effectively make use of a site of an existing substation to facilitate the increase provision of the electrical elements and a change from the old elements to new elements.

A gas insulated switchgear device according to the invention comprises at least one gas insulated main bus bar installed in an attachment surface and a plurality of feeder units each having one end connected to the at least one gas insulated main bus bar and an insulating terminal at its other end, said feeder units being provided in a longitudinal direction of the at least one gas insulated main bus bar, wherein a bus-section-unit section-unit is arranged on a portion of the at least one gas insulated main bus bar. The bus-section-unit includes at least a circuit breaker and disconnecting switches connected to both ends thereof and is insulated with the gas. The bus-section-unit is connected to the at least one gas insulated main bus bar at one end thereof and has external lead-out means to be connected to external connecting means at the other end thereof. Thus, by the use of the bus-section-unit arranged on a portion of at least one gas insulated main bus bar, it can be easily effected to separately provide the substation equipment devices, to perform connection to other substation equipment device which are additionally provided and to renew the substation equipment devices.

DESCRIPTION OF THE PREFERRED EMBODIMENTS

The present invention will now be explained with reference to FIGS. 1-18.

Figure 1:
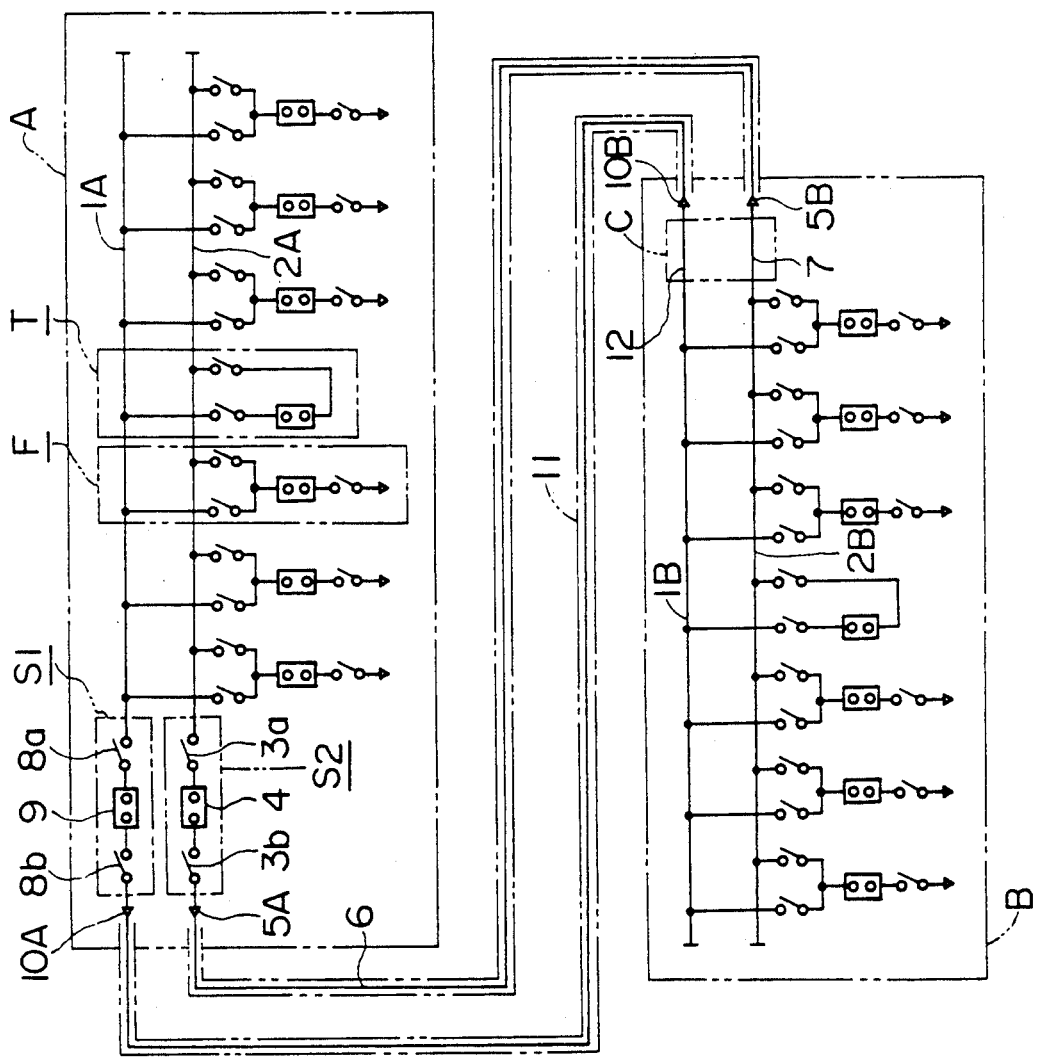
FIG. 1 is a circuit diagram with a single wire showing an example of a gas insulated switchgear equipment device in a structure of a substation according to the present invention.

FIG. 1 shows an example of a structure of dual main bus bars of a substation according to the present invention as a circuit diagram with a single wire. Substation equipment device A and B include first and second dual gas insulated main bus bars 1A, 2A and 1B, 2B mounted on predetermined surfaces in parallel with each other, respectively, and further include a bus-tie-unit T for interconnecting the dual gas insulated main bus bars, and a plurality of feeder units F arranged in a longitudinal direction of the gas insulated main bus bar, respectively. These substation equipment device A and B can be installed altogether or additionally, and are applicable in the case where old substation equipment devices, are renewed to new substation equipment devices. The gas insulated main bus bar 1A of the substation equipment devices A and the gas insulated main bus bar 1B of the substation equipment devices B are interconnected by a bus-section-unit S1 having disconnecting switches 8a, 8b and a circuit breaker 9, external lead-out means 10a, 10b, external connecting means 11 and an auxiliary bus bar 12. Further, the other gas insulated main bus bars 2A and 2B are also interconnected by a bus-section-unit S2 having disconnecting switches 3a, 3b and a circuit breaker 4, external lead-out means 5a, 5b, external connecting means 6 and an auxiliary bus bar 7. In the illustrated construction of the circuit, when one of the substation equipment devices A or B is stopped due to inspection or electrical failure, by operating the circuit breakers 4 and 9 of the bus-section-units S2 and S1 and opening the disconnecting switches 3a, 3b, 8a and 8b, the other substation equipment device B or A can be operated independently. Further, in the illustrated example, the bus-section-units S1, S2 and an auxiliary bus bar unit C are provided at an end portion of each substation equipment device A, B.

As another example of the construction of the circuit, in place of the auxiliary bus bar unit C for the ends of the gas insulated main bus bars 1B and 2B of the substation equipment B, similar bus-section-units may be arranged in those ends of the main bus bars so that, if the external connecting means 5, 11 electrically fail, by operating both of the bus-section-units of the substation equipments A and B, the substation equipment device A or B can be operated independently.

Figure 3:
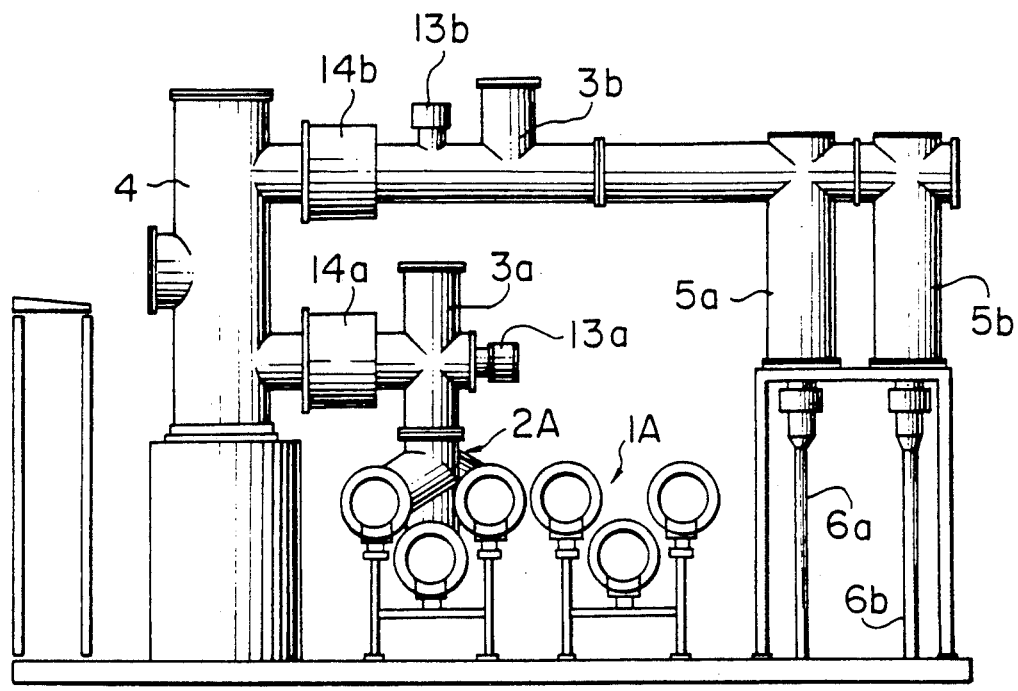
FIG. 3 is a side view taken along the line III—III in FIG. 2.
Figure 4:
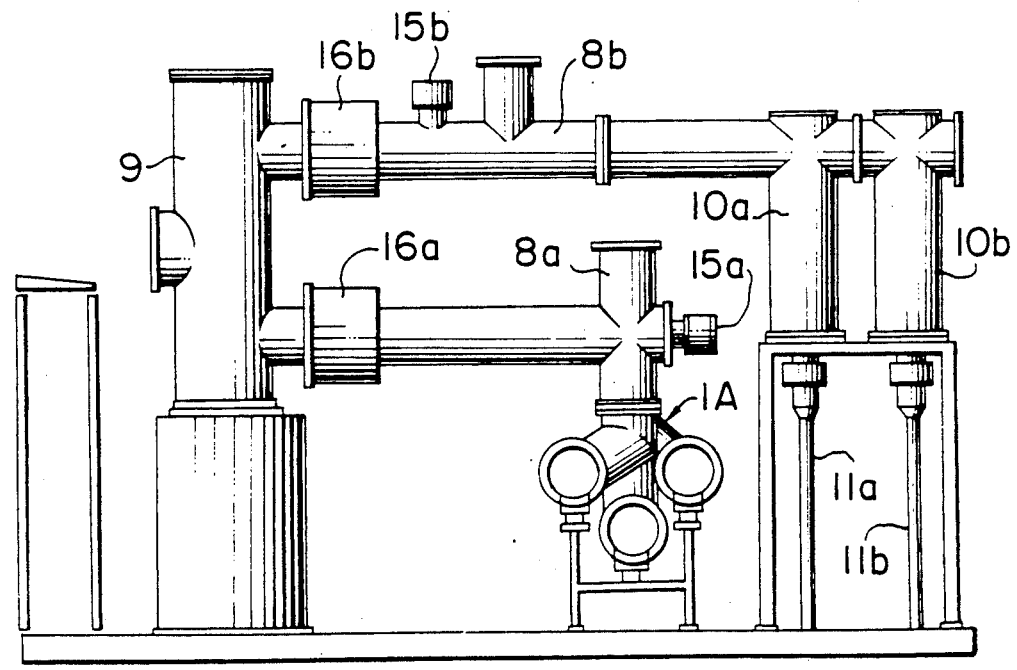
FIG. 4 is a side view taken along the line IV—IV in FIG. 2.

Next, an embodiment of the gas insulated switchgear equipment according to the present invention and associated with the above-illustrated construction of the circuit will be fully explained with reference to FIGS. 2 to 5. The substation equipment devices A and B shown in these drawings are installed separately. The gas insulated main bus bars 1A and 2A of the substation equipment device A are arranged horizontally on two parallel lines above the attachment surface, and are formed as a dual bus bar construction of the so-called phase separating type, where the phases are formed independently. The dual gas insulated main bus bars 1A and 2A have different lengths so that the ends thereof are offset to obtain a space. At the ends of the main bus bars, three vertical circuit breakers 4 for the bus-section-unit S2 and three vertical circuit breakers 9 for the bus-section-unit S1, which provide six phases, are arranged in order. As shown in FIG. 3, the inner one (S2) of two bus-section-units S1, S2 has a gas insulated construction and is connected to the gas insulated main bus bar 2A through a lower connecting portion of the circuit breaker 4, a current transformer 14a, disconnecting switch 3a and the like. An upper connecting portion of the circuit breaker 4 (FIG. 3) is extended toward the gas insulated main bus bars 1A, 2A and is connected, through a current transformer 14b, and disconnecting switch 3b and external lead-out means 5a and 5b such as cable heads arranged on an opposite side of the circuit breaker of the gas insulated main bus bar 1A to cables which are the external connecting means 6a, 6b. On the other hand, as shown in FIG. 4, the other bus-section-unit S1 also has a gas insulated construction and is connected to the gas insulated main bus bar 1A through a lower connecting portion of the circuit breaker 9, a current transformer 16a and a disconnecting switch 8a. An upper connecting portion of the circuit breaker 9 is extended toward the gas insulated main bus bar 1A and is connected, through a current transformer 16b, a disconnecting switch 8b and to external lead-out means 10a and 10b arranged on an opposite side of the circuit breaker of the gas insulated main bus tar 1A to cables 11a, 11b.

Figure 5:
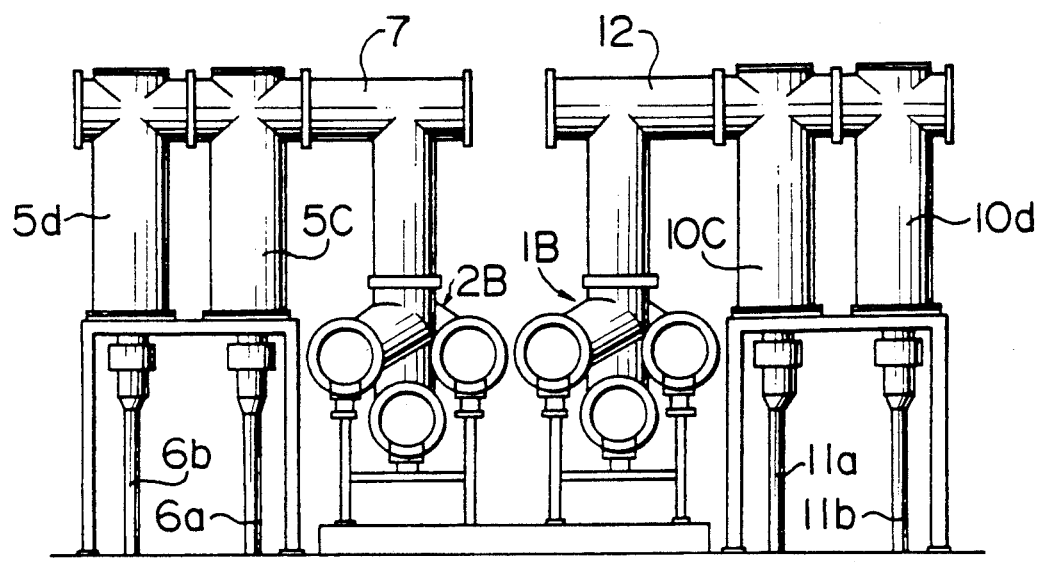
FIG. 5 is a side view taken along the line V—V in FIG. 2.

The gas insulated main bus bars 1B and 2B of the substation equipment B are arranged horizontally on two parallel lines above an attachment surface, and are also formed as a dual bus bar construction of the so-called phase separating type. On longitudinal ends of the dual gas insulated main bus bars 1B and 2B, the auxiliary bus bar unit C is arranged to have three phases in order to be situated on both sides of the gas insulated main bus bars 1B and 2B. As shown in FIG. 5, the auxiliary bus bar unit C is so constructed that external lead-out means 10c, 10d and 5c, 5d are opposite to each other with respect to the gas insulated main bus bars 1B and 2B and are connected to the corresponding gas insulated main bus bars 1B and 2B through auxiliary gas insulated bus bars 12 and 7, respectively. The gas insulated main bus bars 2A and 2B are electrically interconnected through the bus-section-unit S2 and the auxiliary bus bar unit C by interconnecting the external lead-out means 5a, 5b and 5c, 5d thereof by means of the external connecting means 6a and 6b, and the gas insulated main bus bars 1A and 1B are electrically interconnected through the bus-section-unit S1 and the auxiliary bus bar unit C by interconnecting the external lead-out means 10a, 10b and 10c, 10d thereof by means of the external connecting means 11a and 11b.

Figure 2:
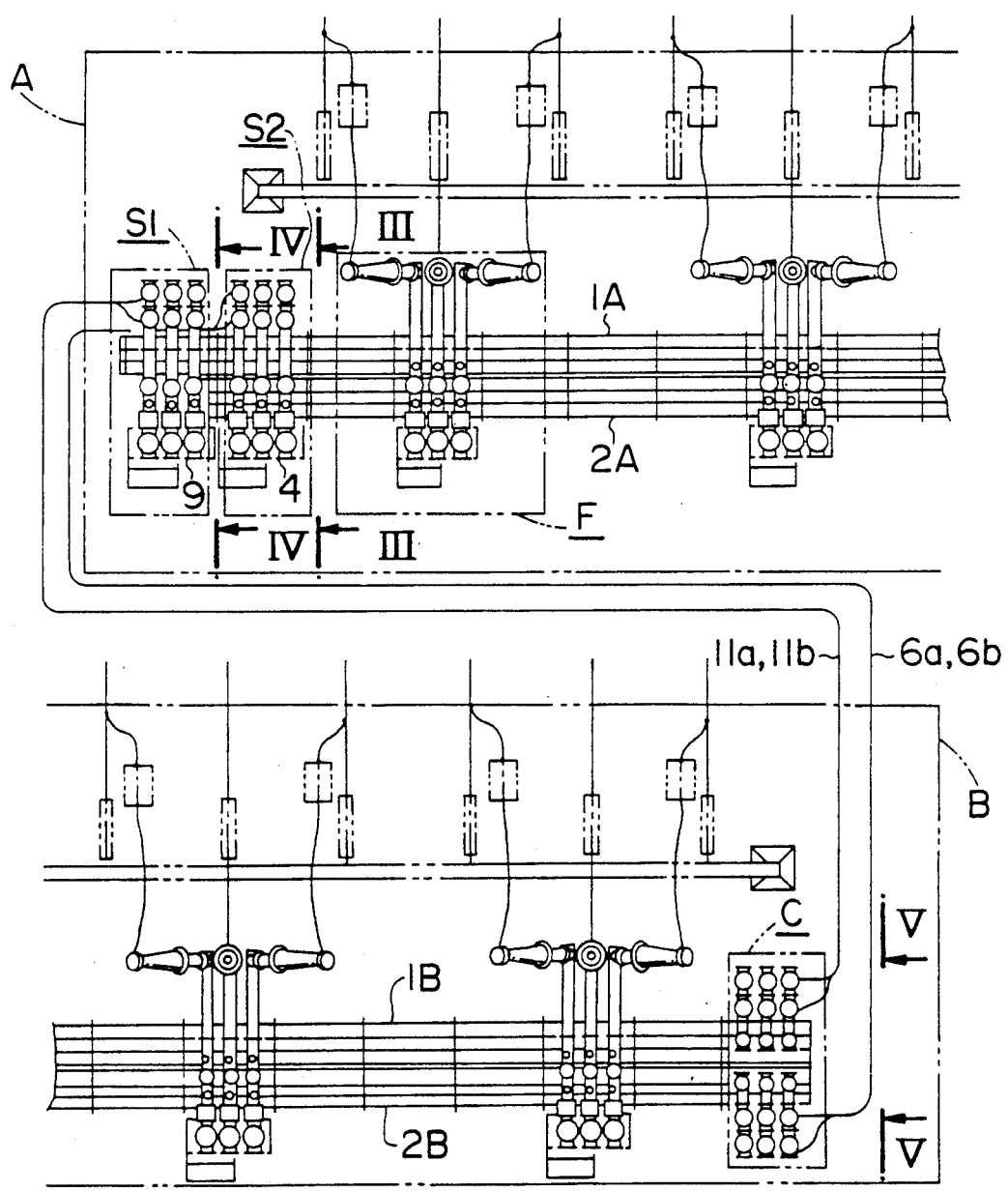
FIG. 2 is a schematic partial plan view of an embodiment of the gas insulated switchgear equipment device of FIG. 1.

Accordingly, as shown in FIG. 2, the first and second substation equipment devices A and B, wherein a plurality of the bus-tie-units T and the feeder units F insulated by the gas by the use of the vertical circuit breakers arranged to maintain the insulation distance along the gas insulated main bus bars 1A, 1B and 2A, 2B, can be used as an electrically integral system by the use of the external lead-out means 5a-5d, 10a-10d and the external connecting means 6a, 6b and 11a, 11b.

When the cable heads are used as the external lead-out means 5a-5d, 10a-10d of the bus-section-units S1, S2 as explained above, cables can be used as the external connecting means 6a, 6b, 11a, 11b. This is preferable, since the connections are easily performed because only a cable pit is needed to be provided and there is little limitation in insulation. It is also possible to carry out the connections by means of bushings and aerial conductors in response to the condition of the site where the substations A, B are located. Moreover, while the feeder units F in FIG. 2 are illustrated to have the structure of the phase separated type using bushings, they may use cables and/or feeder units having the structure of the three phase integral type.

According to the above-mentioned construction of the illustrated embodiment device, in the substation equipment A, the external lead-out means 5a, 5b and 10a, 10b are installed in the bus-section-unit S1 and S2 with smaller attachment spaces than those of the otter units, and in the other substation equipment device B the auxiliary bus bar units 7 and 12 are arranged to be opposed to each other; therefore, when a plurality of substations are interconnected, bus-section-units S1, S2 and dimensions associated with the auxiliary bus bar units C can be made smaller.

Figure 9:
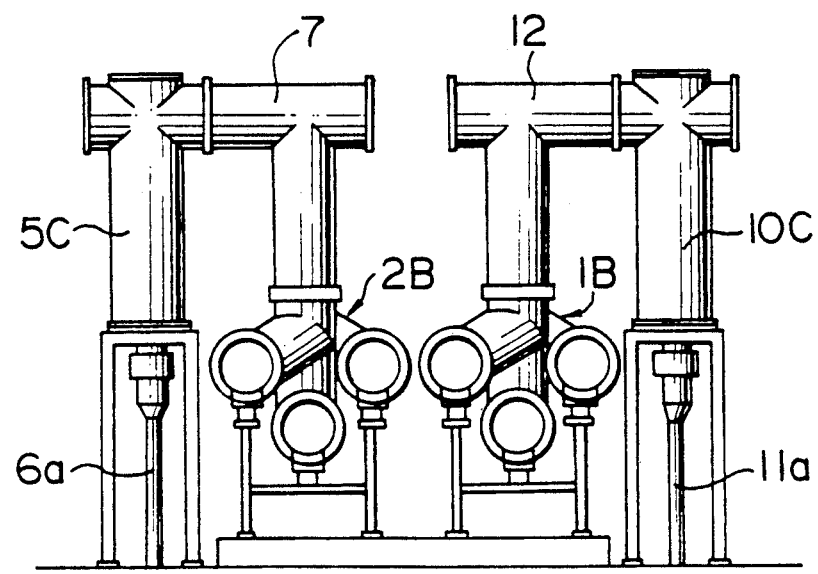
FIG. 9 is a side view taken along the line IX—IX in FIG. 6.
Figure 6:
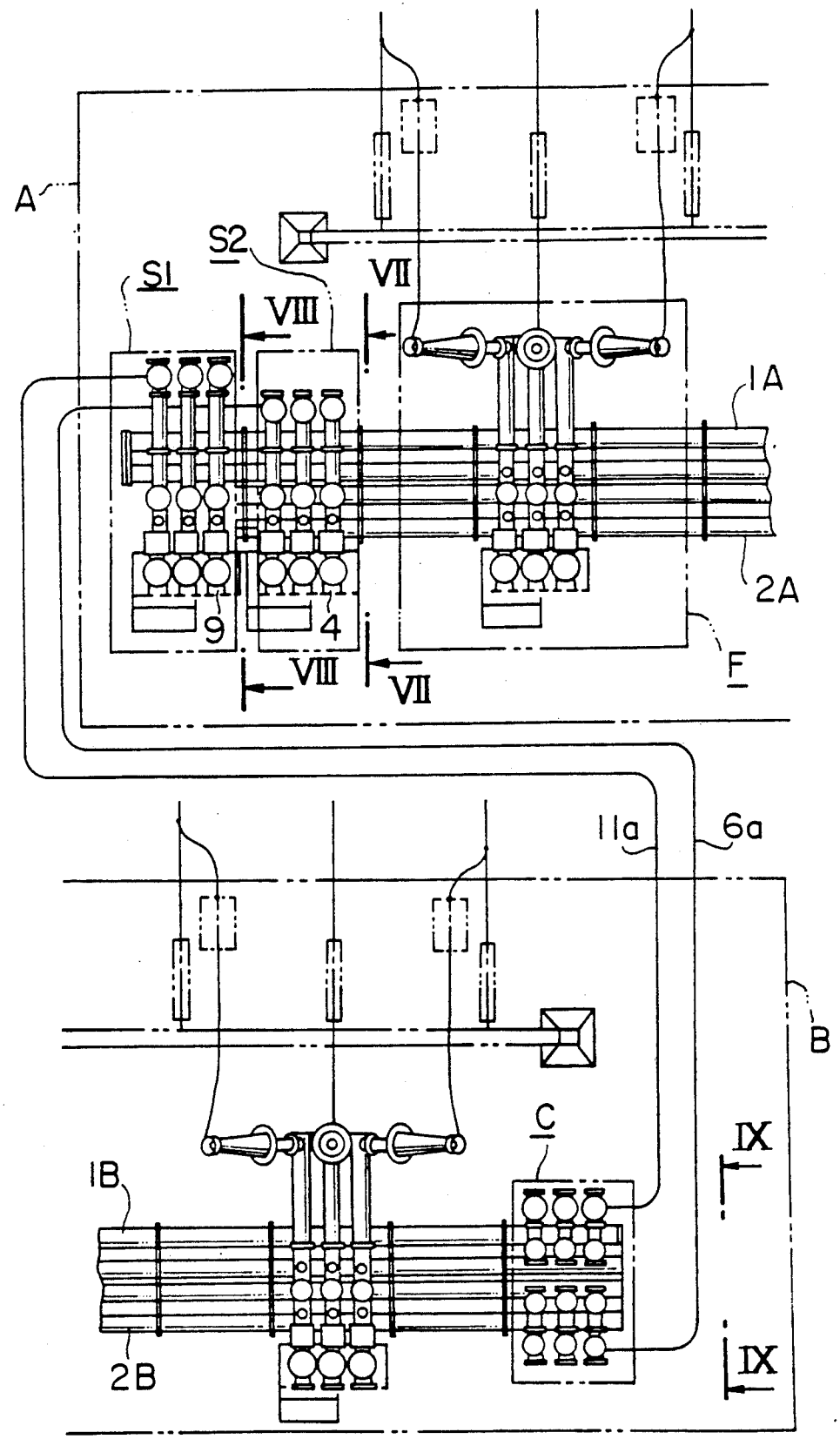
FIG. 6 is a schematic partial plan view of another embodiment of the gas insulated switchgear equipment of FIG. 1.
Figure 7:
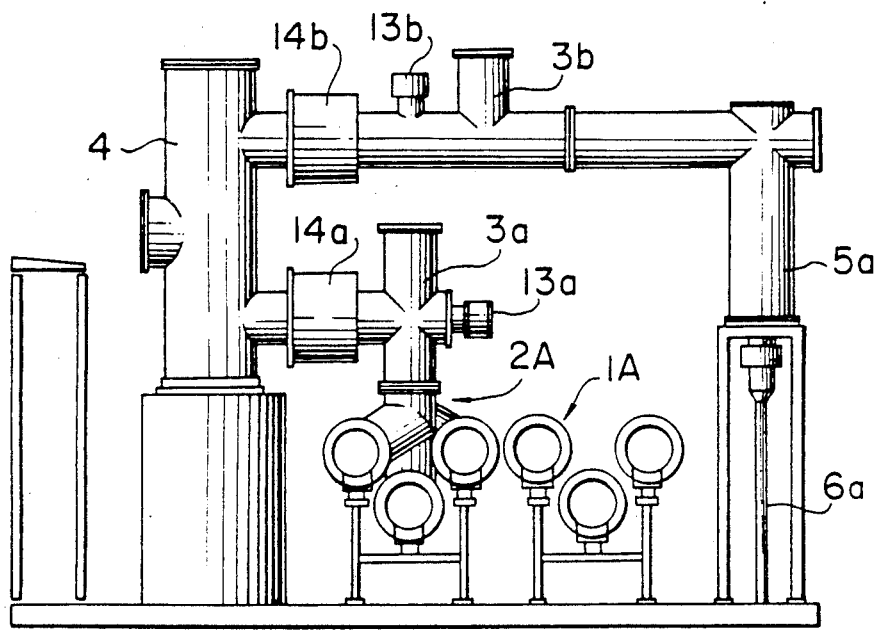
FIG. 7 is a side view taken along the line VII—VII in FIG. 6.
Figure 8:
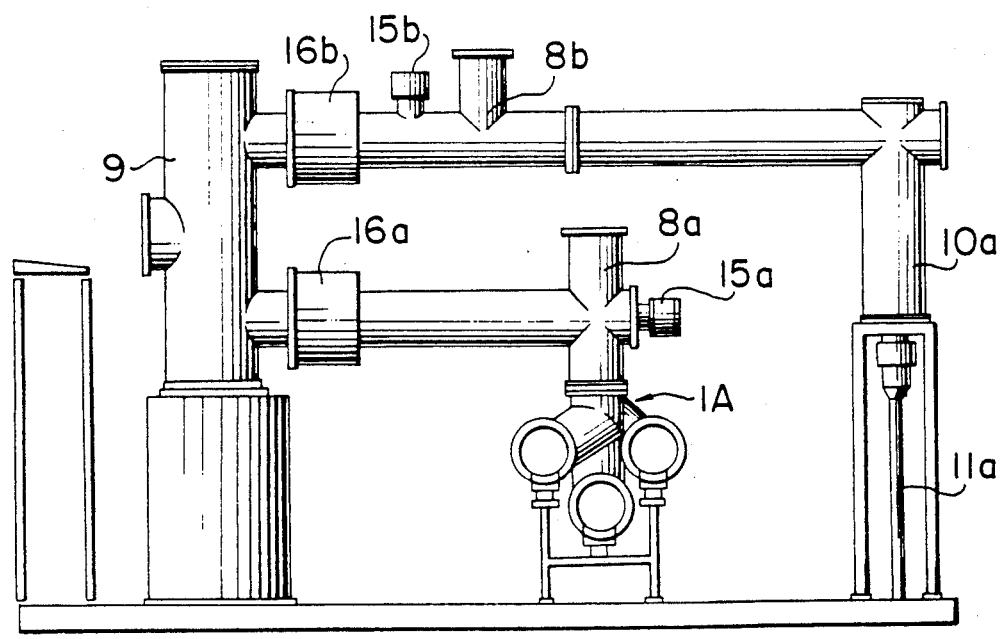
FIG. 8 is a side view taken along the line VIII—VIII in FIG. 6.

FIGS. 6 to 9 show another embodiment of the gas insulated switchgear equipment device according to the present invention. In this embodiment the arrangement of the gas insulated main bus bars 1A, 1B and 2A, 2B, the feeder units F and the like in the substation equipment device A and B may be the same as that of the above-mentioned first embodiment having a large capacity regarding the main bus bars. However, this second embodiment differs from the first embodiment in the point that the portions of the bus-section-units S1, S2 and auxiliary bus bar units C are altered in consideration of smaller capacity main bus bars. More particularly, as shown in FIGS. 7 and 8, each of the bus-section-units S1, S2 uses a vertical circuit breaker 4 or 9 and is insulated by gas. In this second embodiment, only one external lead-out means 5a, 10a is provided in connection with the corresponding upper connecting portion of the circuit breaker 4, 9 and, as shown in FIG. 9, the corresponding auxiliary bus bar unit C includes only one external lead-out means 5c, 10c. The external lead-out means 5a, 10a and 5c, 10c are electrically interconnected by the external connecting means 6a, 11a such as a cable, respectively. The gas insulated switchgear equipment device having the construction mentioned above can effectively be applied to the substation having smaller capacity main bus bars.

Figure 10:
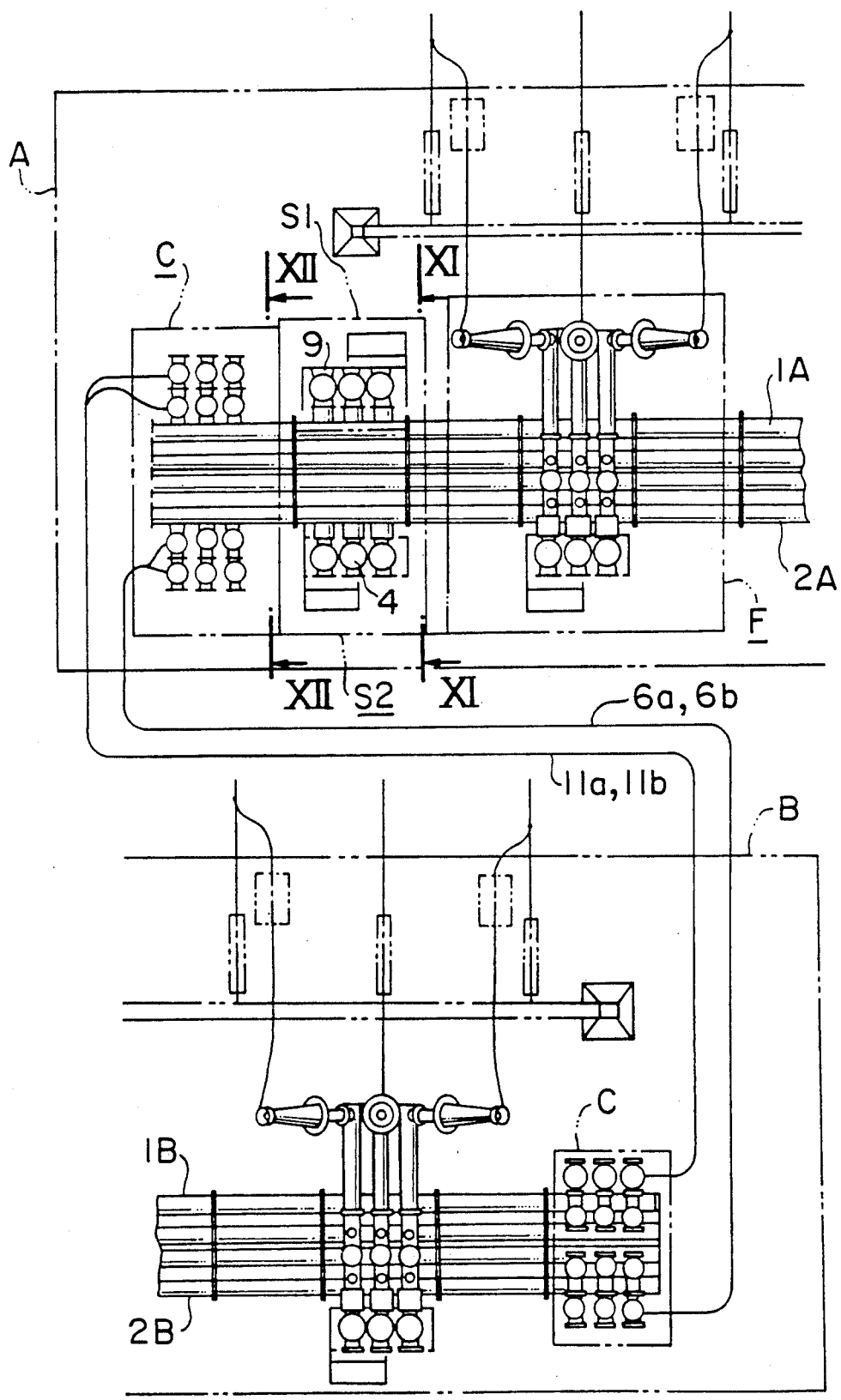
FIG. 10 is a schematic partial plan view of a further embodiment of the gas insulated switchgear equipment of FIG. 1.
Figure 11:
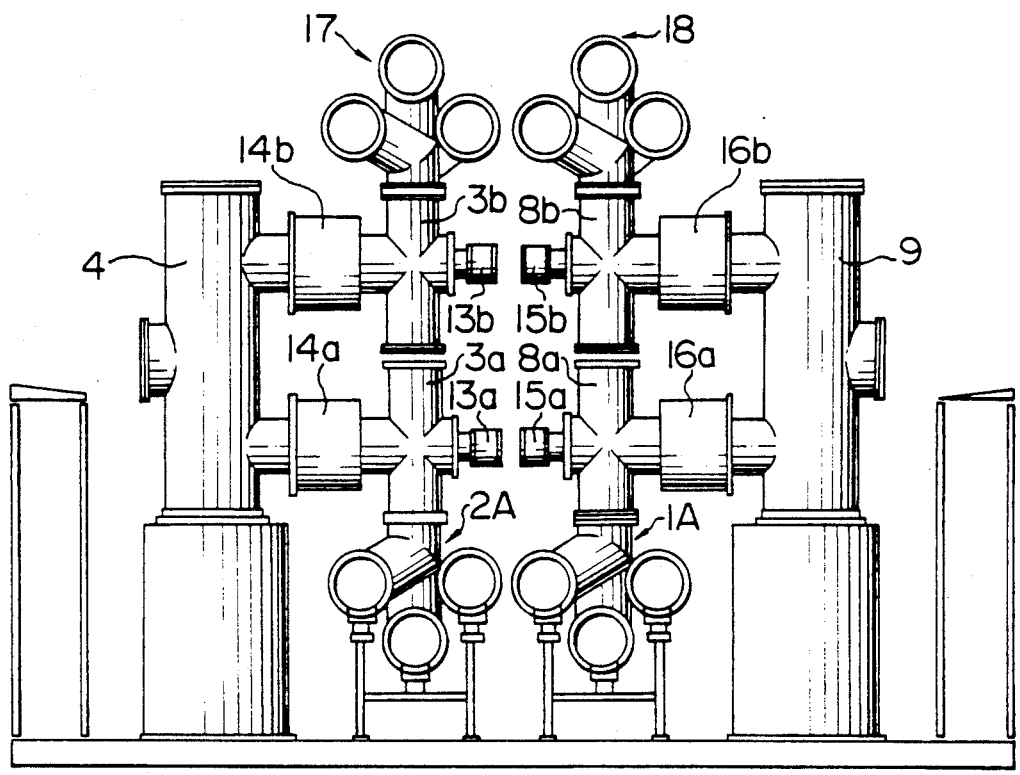
FIG. 11 is a side view taken along the line XI—XI in FIG. 10.
Figure 12:
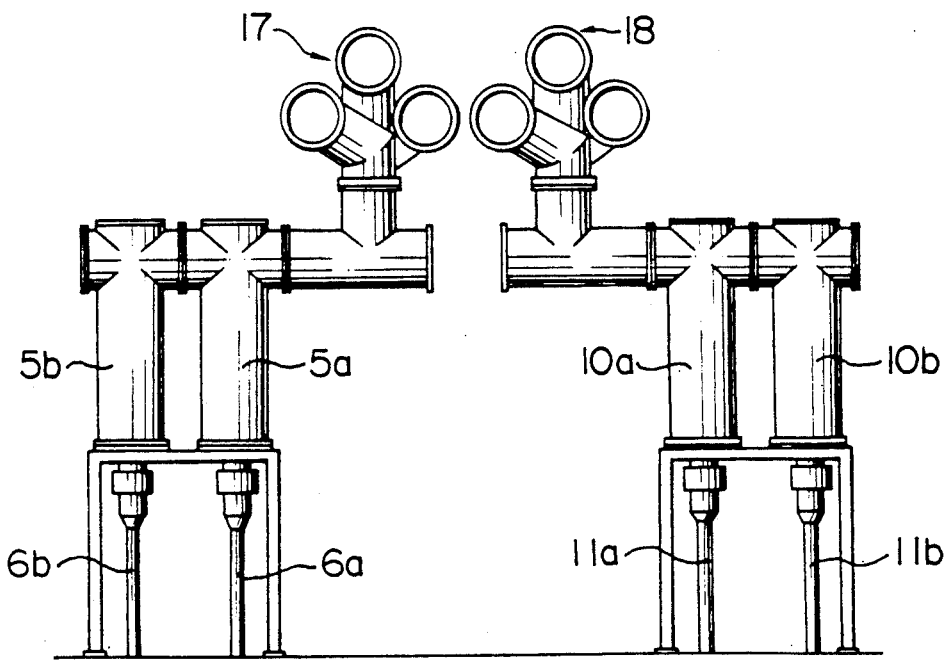
FIG. 12 is a side view taken along the line XII—XII in FIG. 10.

FIGS. 10 to 12 show a third embodiment of the gas insulated switchgear equipment device according to the present invention. Also, in this embodiment, the vertical circuit breakers 4 and 9 are used for the bus-section-units S1 and S2 and are arranged on the ends of the gas insulated main bus bars 1A and 2A of the substation equipment A. In this case, the three circuit breakers are provided in order in association with each of the gas insulated main bus bars 1A and 2A. As shown in FIG. 11, the lower connecting portion of the circuit breaker 4 is connected to the gas insulated main bus bar 2A through the current transformer 14a and the disconnecting switch 3a, and the lower connecting portion of the circuit breaker 9 is connected to the gas insulated main bus bar 1A through the current transformer 16a and the disconnecting switch 8i a. Further, the upper connecting portion of the circuit breaker 4 is connected to the auxiliary gas insulated bus bar 17 through the current transformer 14b and the disconnecting switch 3b, and the upper connecting portion of the circuit breaker 9 is connected to the auxiliary gas insulated bus bar 18 through the current transformer 16b and the disconnecting switch 8b. The auxiliary gas insulated bus bars 17 and 18 are arranged parallel to the gas insulated main bus bars 2A and 1A above the upper connecting portions of the circuit breakers 4 and 9, respectively and extend along the gas insulated main bus bars 2A and 1A, respectively. As shown in FIG. 12, the external lead-out means 5a, 5b and 10a, 10b are arranged in opposed relation to each other with respect to the auxiliary gas insulated bus bar; 17 and 18, and are positioned in parallel at the side of the bus-section-units S1 and S2. The other substation equipment device B is arranged similar to the substation equipment device B shown in FIG. 2. Further, the gas insulated switchgear equipment devices of the substation equipments devices A and B are interconnected by interconnecting the external lead-out means thereof through the external connecting means 6a, 6b and 11a, 11b, similar to FIG. 2. Also, in the embodiment shown in FIG. 10, it is possible to install the equipment with the same installation area as in the case of FIG. 2.

Figure 13:
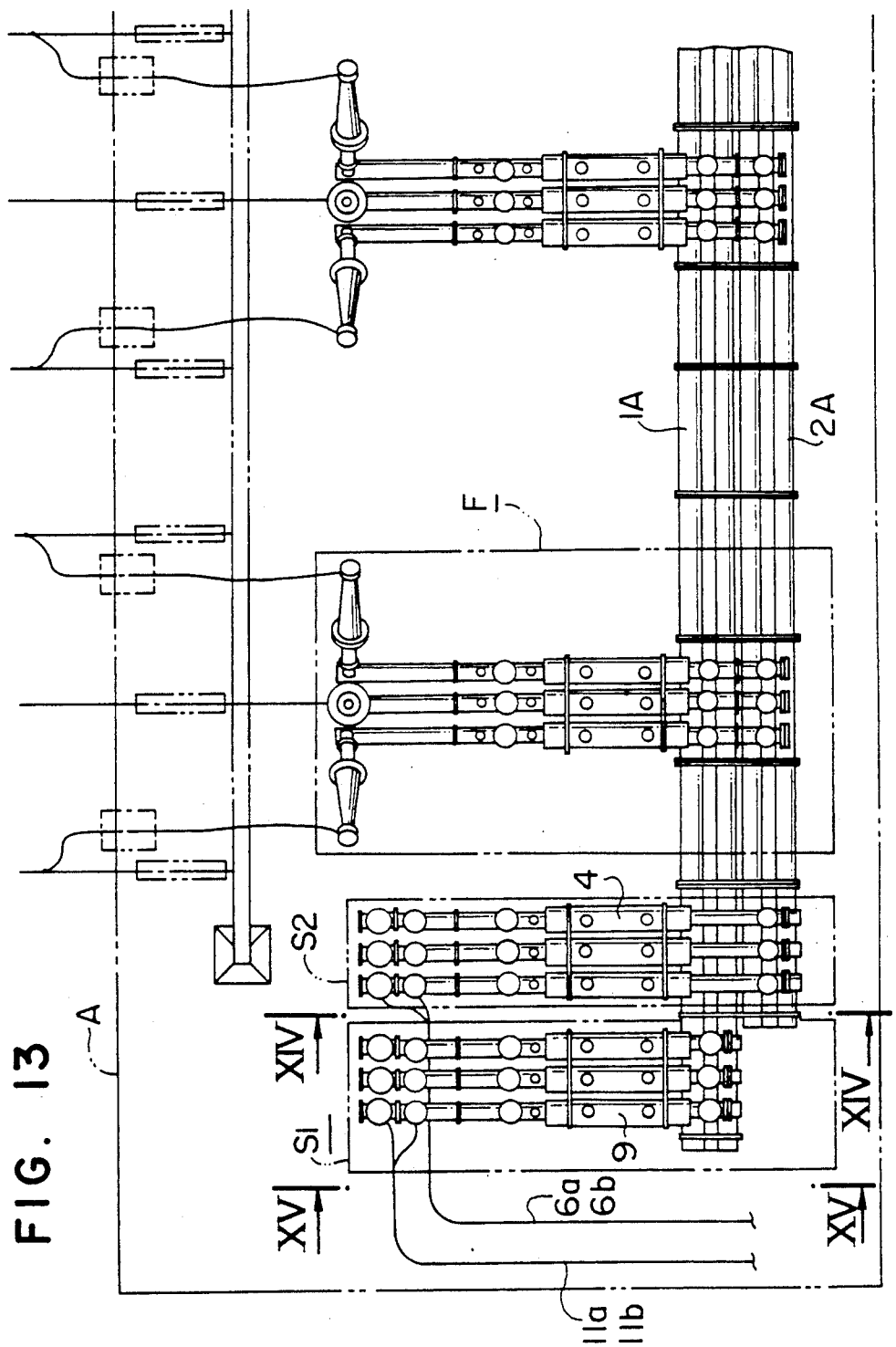
FIG. 13 is a schematic partial plan view of another embodiment of the gas insulated switchgear equipment of FIG. 1.
Figure 14:
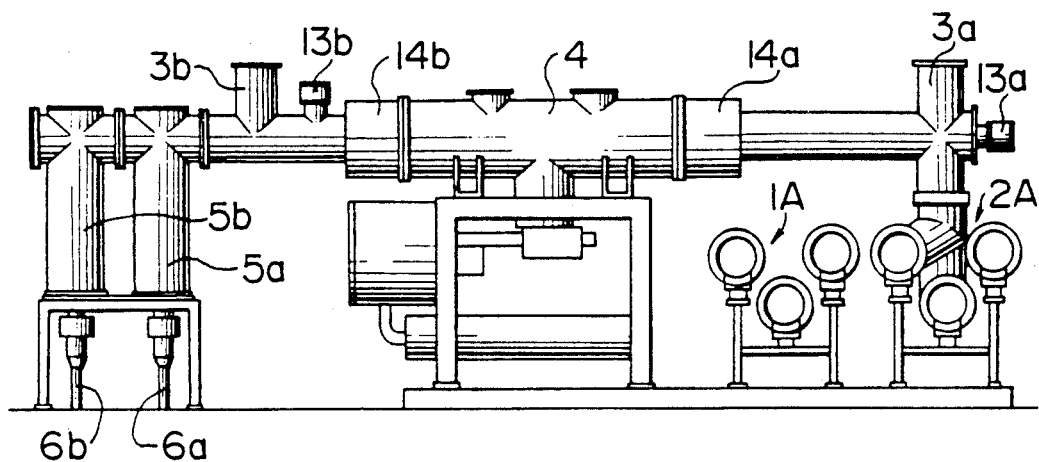
FIG. 14 is a side view taken along the line XIV—XIV in FIG. 13.
Figure 15:
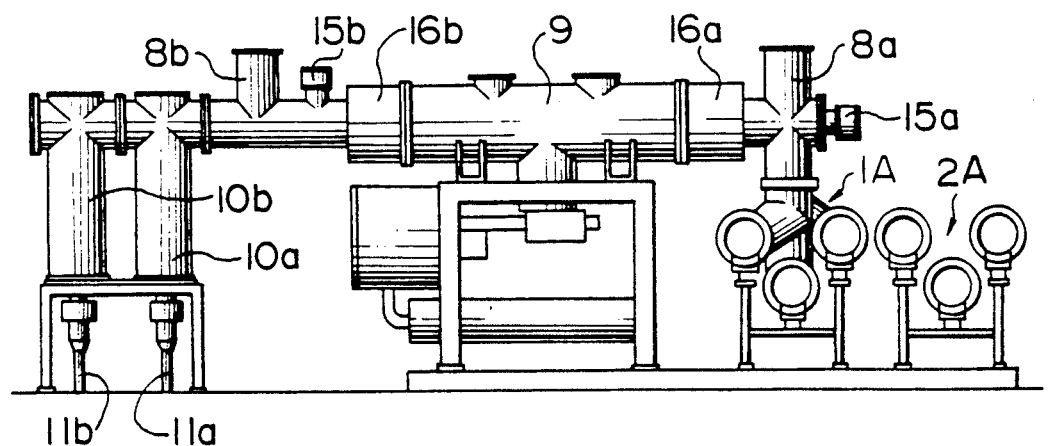
FIG. 15 is a side view taken along the line XV—XV in FIG. 13.

While in the embodiments mentioned above, examples in which the vertical circuit breakers are applied to each of the equipments were explained, the construction of the circuit of FIG. 1 may be obtained by adopting horizontal circuit breakers, as will be described with reference to FIGS. 13 to 15. In an embodiment shown in FIGS. 13 to 15, the gas insulated main bus bars 1A and 2A in the substation equipment A are installed in parallel on two horizontal and parallel lines near the attachment surface and each has a dual main bus bar construction of the phase separating type. On the longitudinal ends of the dual gas insulated main bus bars 1A and 2A, three horizontal circuit breakers 4 and three horizontal circuit breakers 9, which provide six phases and act as the bus-section-units S1 and S2, respectively, are arranged in order perpendicular to each of the main bus bars. As shown in FIG. 14, each of the horizontal circuit breakers 4 is connected, at one end, to the gas insulated main bus bar 2A through the current transformer 14a and the disconnecting switch 3a, and each of the horizontal circuit breakers 9 is connected, at one end, to the gas insulated main bus bar 1A through the current transformer 16a and the disconnecting switch 8a, as shown in FIG. 15. Further, the other end of each circuit breaker 4 is connected to the external lead-out means 5a, 5b through the current transformer 14b and the disconnecting switch 3b and the other end of each circuit breaker 9 is connected to the external lead-out means 10a, 10b through the current transformer 16b and the disconnecting switch 8b, thereby constituting the bus-section-units S1 and S2. The other substation equipment device B is arranged similar to the substation equipment device B shown in FIG. 2. Further, the substation equipment devices A and B are interconnected by connecting the external lead-out means 5a, 5b and 10a, 10b to the external lead-out means of the auxiliary bus bar units through the external connecting means 6a, 6b and 11a, 11b, similar to FIG. 2. In the arrangement shown in FIG. 13, the feeder unit F is designed to have a horizontal circuit breaker arranged perpendicular to the gas insulated main bus bars 1A and 2A. In this way, also in the case where the substation equipment devices A and B are designed to have the horizontal circuit breakers, it is possible to obtain substationally the same technical effect as those of the previous embodiments mentioned above.

In the above-mentioned embodiments of the present invention, examples in which the bus-section-units S1 and S2 are arranged only at one end of the gas insulated main bus bars in one of the substations were explained; however, the bus-section-units may be arranged on both ends of the gas insulated main bus bars of both substation equipment devices to facilitate the connection between the adjacent substation equipment devices and to easily increase additional substation equipment devices, and further to facilitate the manufacture of the substation equipment devices by making the same constructions.

Figure 16:
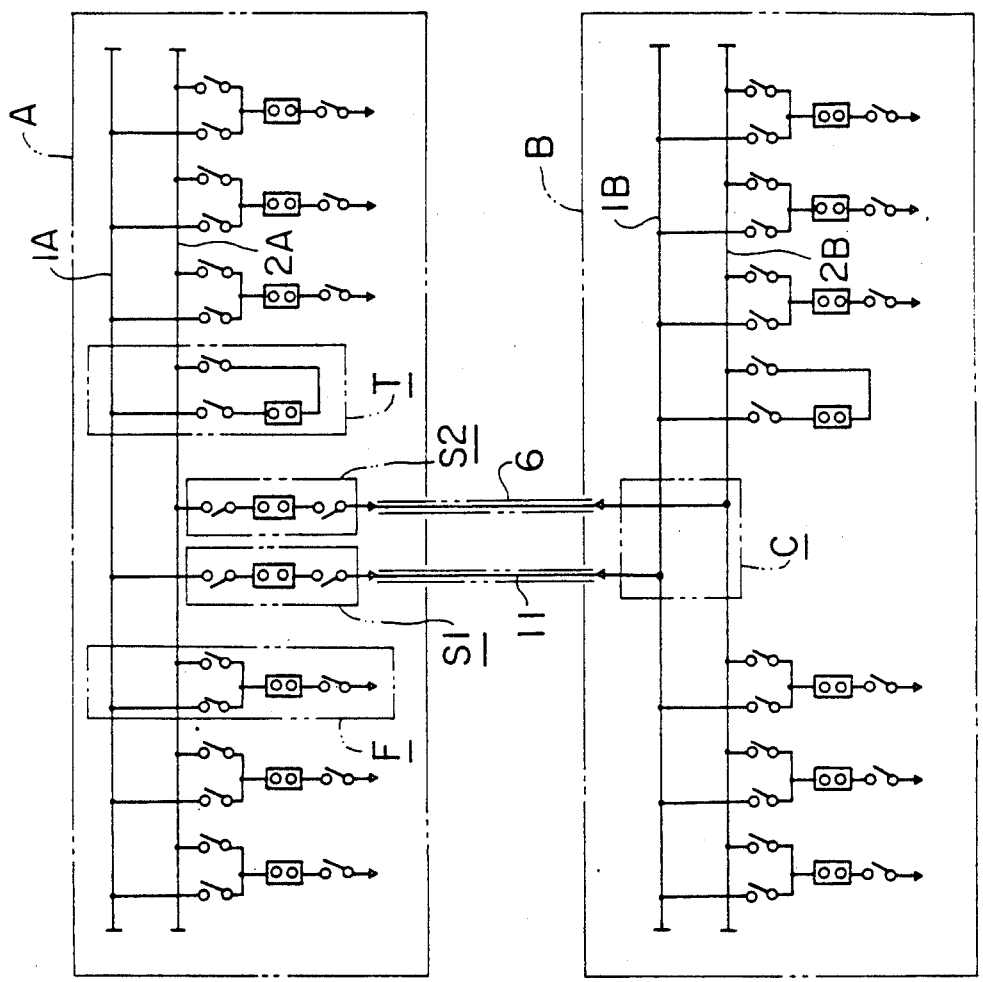
FIG. 16 is a circuit diagram with a single wire showing another example of a gas insulated switchgear equipment in a structure of a substation according to the present invention.

FIG. 16 shows another example of the structure of the substation having the dual main bus bar construction as a circuit diagram with a single wire. The substation equipments A and B in the structure of the substation in this example are arranged substantially symmetrically. Further, both of the gas insulated main bus bars 1A, 2A and 1B, 2B are installed in parallel to each other, and a plurality of feeder units F and bus-tie-units tie-units T are similarly arranged on both main bus bars, thereby constituting the substation equipment devices A and B. In addition, the bus-section-units S1 and S2 are arranged on portions of the gas insulated main bus bars 1A and 2A of the substation equipment device A (for example, on a portion between the feeder units F or a portion between the feeder unit F and the bus-tie-unit T), and an auxiliary bus bar unit C is arranged on a portion of the gas insulated main bus bars 1B and 2B of the other substation equipment device B in correspondence to the bus-section-units S1 and S2. The substation equipment devices A and B can be interconnected by electrically connecting the bus-section-units S1, S2 to the auxiliary bus bar unit C through the external connecting means 6 and 11. Also, in this example, as in the case of FIG. 1, instead of the auxiliary bus bar unit C in the substation equipment B, bus-section-units may be provided in the same manner as the substation equipment device A. Further, if the illustrated substation is applied to a substation having a single bus bar, the same construction can be used as a whole.

Figure 17:
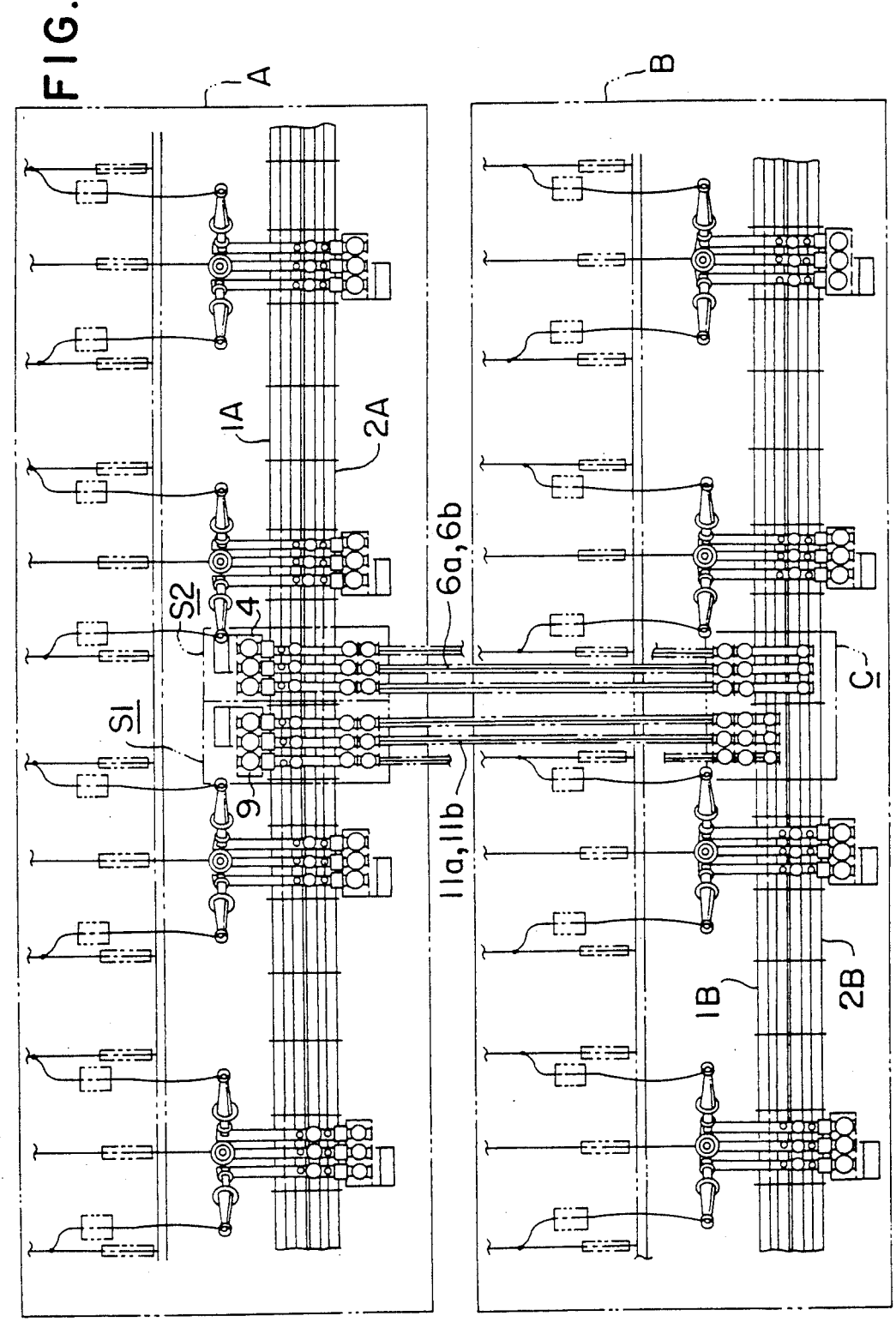
FIG. 17 is a schematic partial plan view of an embodiment of the gas insulated switchgear equipment of FIG. 16.
Figure 19:
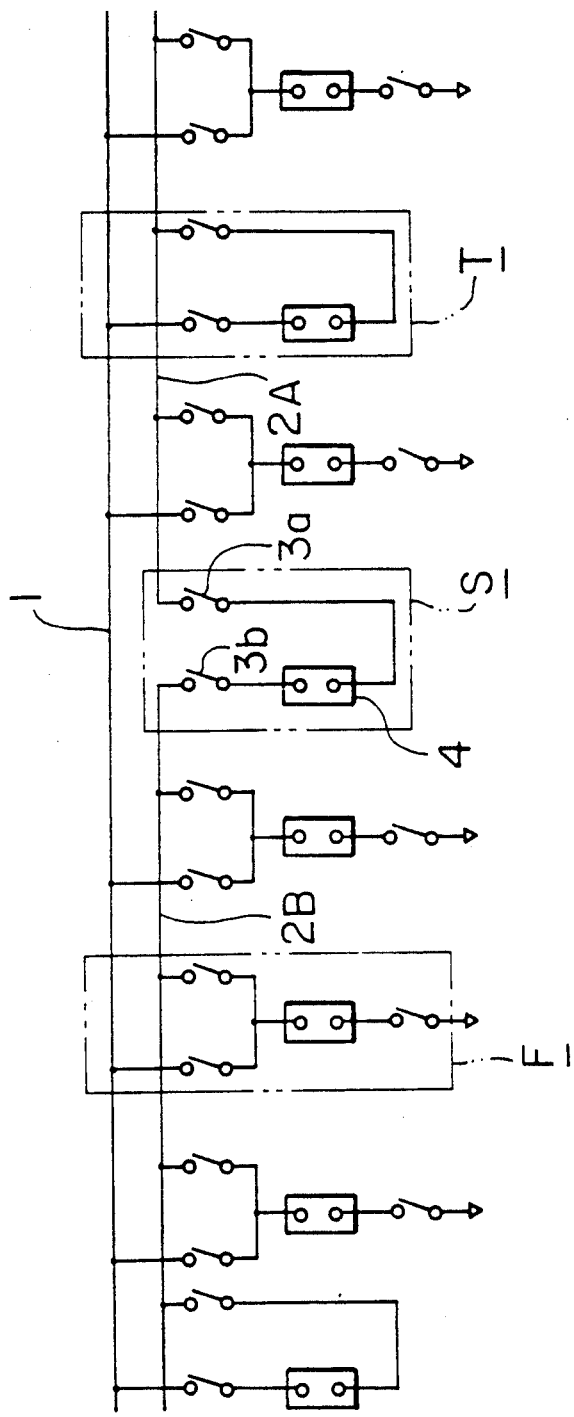
FIG. 19 is a circuit diagram with a single wire showing a structure of a prior art substation.

An embodiment of the construction of the circuit of FIG. 16 is shown in FIG. 17. The substation equipment devices A and B shown in FIG. 17 have substantially the same dimension and include phase separated type dual gas insulated main bus bars 1A, 2A and 1B, 2B, respectively. Further, between the feeder units of the substation equipment A, the bus-section-units S1 and S2 connected to the gas insulated main bus bars 1A and 2A are positioned, which bus-section-units S1 and S2 includes three circuit breakers arranged in parallel, respectively, which provide six phases. The concrete construction of each of the bus-section-units S1 and S2 may be the same as, for example, those shown in FIGS. 3 and 4. Further, between the feeder units of the other substation equipment B, two sets of auxiliary bus bar units C are arranged in order on one side in correspondence to the bus-section-units S1 and S2 of the substation equipment A. The concrete construction of each of the auxiliary bus bar units may be the same as that shown in FIG. 5. The substation equipment devices A and B can be interconnected by electrically connecting the bus-section-units S1, S2 to the auxiliary bus bar units C through the external lead-out means and the external connecting means such as cables arranged in pits formed in the attachment surface. In this way, when the substation equipment devices A and B have the same length, it will be easy to arrange the substation equipment devices in parallel or to arrange the substation equipment devices in an up-and-down direction with respect to the substation building, and to interconnect the substation equipment devices, whereby the increase of the additional substation equipment devices, replacement of the old substation equipment by a new one, and inspection and/or repair of the substation equipment device can be easily carried out. Incidentally, the concrete construction of the embodiment may be obtained by any combination of those described above.

Figure 18:
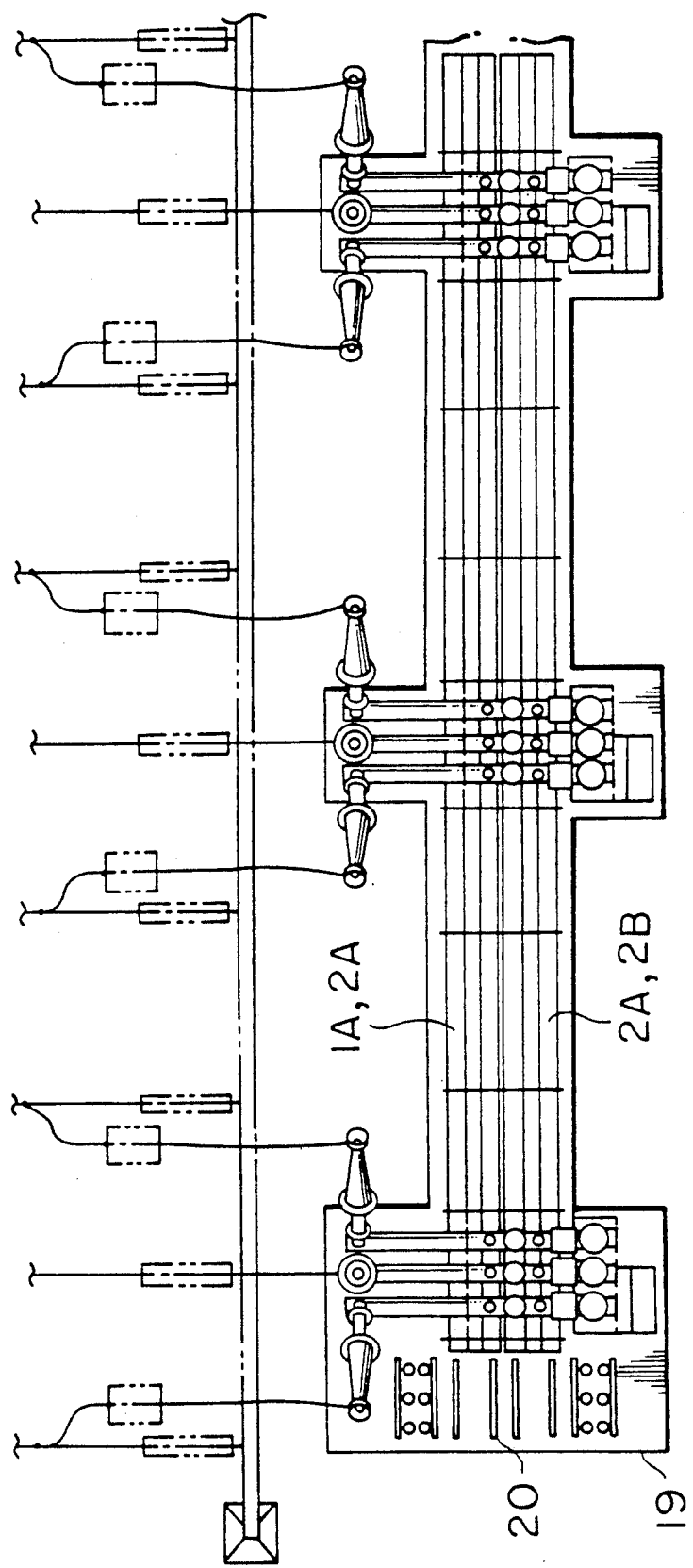
FIG. 18 is a schematic plan view showing a structure of an end portion of the gas insulated switchgear equipment according to the present invention.

In the embodiments shown in FIGS. 2 to 15, examples in which the gas insulated bus-section-units and the auxiliary bus bar units are previously arranged at ends of the gas insulated main bus bars were explained; however, according to the present invention, as shown in FIG. 18, when the substation A or B is constructed, a foundation 19 for attaching thereto the feeder unit arranged at the ends of the gas insulated main bus bars 1A, 2A or 1B, 2B may be formed larger so that foundation bases 20 can be embedded therein. Since the attachment foundation 19 can be utilized to arrange an additional bus-section-unit thereon for performing a predetermined connection as needed, it is very convenient because it can be immediately used when it is desired to increase an additional substation equipment.

In the illustrated embodiments, examples in which each substation equipment comprises the dual main bus bar construction were explained; however, each substation equipment may have a single bus bar construction. Further, as the external lead-out means and/or external connecting means used in the each of the bus-sectionunits and auxiliary bus bar units, not only the above-mentioned combination of the cable heads and cables or the combination of the bushings and aerial conductors but also connecting gas insulated bus bars may be used. In addition, each of the feeder units, bus-tie-unit and bus-section-unit used in the substation equipment may be of a three-phase integral type, as well as of the phase separated type, and also may use the combination of a three-phase integral type and phase separated type according to the condition of the installation site.

According to the gas insulated switchgear equipment of the present invention, even if two substation equipments cannot be installed adjacent to each other due to the limitation of the installation site, the substation equipments can easily be interconnected to be used as an integral substation. Further, it is possible to easily increase an additional substation equipment device in response to the configuration of the installation site of the substation and to very easily renew substation equipment devices by the use of the bus-station-units. In addition, since the bus-section-unit can be formed with substantially the same construction as other units, it can be obtained without making it large-size specially. Finally, when the bus-section-units are used in each of the substation equipments, each of the substation equipments can be operated independently without trouble.

What is claimed is:

1. A gas insulated switchgear equipment device included in a substation equipment device, said substation equipment device comprising at least one gas insulated main bus bar arranged in a line on an attachment surface and a plurality of feeder units arranged along a longitudinal direction of said gas insulated main bus bar, each of said plurality of feeder units having one end connected to said gas insulated main bus bar and another end connected to an insulating terminal and including a circuit breaker, wherein:
    a bus-section-unit is arranged on a portion of said gas insulated main bus bar of said substation equipment device;
    said bus-section-unit is insulated by gas and has at least one bus-section-unit circuit breaker having a first and a second end and disconnecting switches connected to both ends of the bus-section-unit circuit breaker; and
    one end of said bus-section-unit is connected to said gas insulated main bus bar of said substation equipment device and another end of said bus-section-unit is provided with at least one external lead-out means connectable to external connecting means of another substation equipment device provided at a location other than a location of said substation equipment device in which said gas insulated switchgear equipment device is included.

2. A gas insulated switchgear equipment device included in a substation equipment device, said substation equipment device comprising first and second gas insulated main bus bars arranged in two parallel lines on an attachment surface, respectively, a bus-tie-unit interconnecting said first and second gas insulated main bus bars, and a plurality of feeder units arranged along a longitudinal direction of said gas insulated main bus bar, each of said plurality of feeder units having one end connected to each of said gas insulated main bus bars and another end connected to an insulating terminal, wherein:
    first and second bus-section-units are arranged on a portion of each of said gas insulated main bus bars of said substation equipment, respectively;
    each of said bus-section units is insulated by gas and has at least one bus-section-unit circuit breaker having a first end and a second end and disconnecting switches connected to both ends of the bus-section-unit circuit breaker; and
    one end of each of said bus-section-units is connected to a corresponding one of said first and second gas insulated main bus bars of said substation equipment device and another end of each of said bus-section-units is provided with at least one external lead-out means connectable to external connecting means of another substation equipment device provided at a location other than a location of said substation equipment device in which said gas insulated switchgear equipment device is included.

3. A gas insulated switchgear equipment device according to claim 1 or claim 2, wherein each gas insulated main bus bar is of a phase separated type.

4. A gas insulated switchgear equipment device according to claim 1 or claim 2, wherein said gas insulated main bus bar is of a three-phase integral type.

5. A gas insulated switchgear equipment device according to claim 1 or claim 2, wherein each bus-section-unit circuit breaker is a vertical type circuit and is arranged at a side of a longitudinal direction of each gas insulated main bus bar.

6. A gas insulated switchgear equipment device according to claim 1 or claim 2, wherein each bus-section-unit circuit breaker is a horizontal type circuit breaker and is arranged perpendicular to and above each gas insulated main bus bar.

7. A gas insulated switchgear equipment device according to claim 1 or claim 2, wherein each external lead-out means comprises a cable head connected to a cable.

8. A gas insulated switchgear equipment device according to claim 1 or claim 2, wherein each bus-section-unit is connected to at least one end of each gas insulated main bus bar.

9. A gas insulated switchgear equipment device according to claim 1 or claim 2, wherein each bus-section-unit is arranged between feeder units situated in the longitudinal direction of each gas insulated main bus bar.

10. An attachment foundation included in a substation equipment device, said substation equipment device comprising at least one gas insulated main bus bar arranged in a line on an attachment surface and a plurality of feeder units arranged along a longitudinal direction of said gas insulated main bus bar, each of said plurality of feeder units having one end connected to said gas insulated main bus bar and another end connected to an insulating terminal and including a circuit breaker, wherein:
    said attachment foundation being attached to gas insulated bus-section-units which each include at least one bus-section-unit circuit breaker having a first end and a second end and disconnecting switches connected to both ends of the bus-section-unit circuit breaker and which are provided at at least one end of said gas insulated main bus bar of said substation equipment device in a position adjacent to said feeder units; and
    said gas insulated bus-section-units are connectable to another substation equipment device provided at a location other than a location of said substation equipment device in which said attachment foundation is included.

11. A gas insulated switchgear equipment device included in a substation equipment device, said substation equipment device comprising at least one gas insulated main bus bar of a phase separated type arranged in a line on an attachment surface and a plurality of feeder units of a phase separated type arranged along a longitudinal direction of said gas insulated main bus bar, each of said plurality of feeder units having one end connected to said gas insulated main bus bar and another end connected to an insulating terminal and including a circuit breaker, wherein:

a gas insulated bus-section-unit of a phase separated type is arranged on a portion of said gas insulated main bus bar of said substation equipment device;

said bus-section-unit includes at least one bus-section-unit circuit breaker having a first end and a second end and a disconnecting switches connected to both ends of the bus-section-unit circuit breaker; and one end of said bus-section-unit is connected to said gas insulated main bus bar of said substation equipment device and another end of said bus-section-unit is provided with at least one external lead-out means connectable to external connecting means of another substation equipment device provided at a location other than a location of said substation equipment device in which said gas insulated switchgear equipment device is included.

12. A gas insulated switchgear equipment device included in a substation equipment device, said substation equipment device comprising first and second gas insulated main bus bars of a phase separated type arranged in two parallel lines on an attachment surface, respectively, a bus-tie-unit interconnecting said first and second gas insulated main bus bars, and a plurality of feeder units of a phase separated type arranged along a longitudinal direction of said gas insulated main bus bar, each of said plurality of feeder units having one end connected to each of said gas insulated main bus bars and another end connected to an insulating terminal, wherein:

first and second gas insulated bus-section-units of a three-phase integral type are arranged on a portion of each of said gas insulated main bus bars of said substation equipment device, respectively;

each bus-section-unit includes at least one bus-section-unit circuit breaker for each of three phases, each bus-section-unit circuit beaker having a first end and a second end, and disconnecting switches respectively connected to each bus-section-unit circuit breaker at both ends of said bus-section-unit circuit; breaker and one end of each of said bus-section-units is connected to a corresponding one of said first and second gas insulated main bus bars of a said substation equipment device and another end of each of said bus-section-units is provided with at least one external lead-out means for the three phases which is connectable to external connecting means of another substation equipment device provided at a location other than a location of said substation equipment device in which said gas insulated switchgear equipment device is included.

13. A gas insulated switchgear equipment device according to claim 11 or claim 12, wherein each bus-section-unit circuit breaker is a vertical type circuit breaker and is arranged at a side of a longitudinal direction of each gas insulated main bus bar.

14. A gas insulated switchgear equipment device according to claim 11 or claim 12, wherein each bus-station-unit circuit breaker is a horizontal type circuit breaker and is arranged perpendicular to and above each gas insulated main bus bar.

15. A gas insulated switchgear equipment according to claim 11 or claim 12, wherein each external lead-out means comprises a cable head connected to a cable.

16. A gas insulated switchgear equipment device according to claim 11 or claim 12, wherein each bus-section-unit is connected to at least one end of each gas insulated main bus bar.

17. A gas insulated switchgear equipment device according to claim 11 or claim 12, wherein each bus-section-unit is arranged between feeder units situated in the longitudinal direction of each gas insulated main bus bar.

18. A gas insulated switchgear equipment device according to claim 11 or claim 12, wherein each bus-section-unit includes a vertical type circuit breaker and is arranged at one end of each gas insulated main bus bar; an auxiliary gas insulated bus bar unit is provided to extend above each circuit breaker at a position corresponding to an extension line of each gas insulated main bus bar; and said auxiliary gas insulated bus bar unit includes an external lead-out device.

19. A gas insulated switchgear equipment according to claim 12, wherein said first and second gas insulated main bus bars are the same length; and said bus-section-units are arranged in confronting relation to each other.

20. A gas insulated switchgear equipment according to claim 12, wherein said first and second gas insulated main bus bars terminate at different positions; and said bus-section-units are arranged at the same side of said gas insulated main bus bars.

21. A gas insulated switchgear equipment device in a substation equipment device, said substation equipment device comprising at least one gas insulated main bus bar of a three-phase integral type arranged in a line on an attachment surface and a plurality of feeder units of a three-phase integral type arranged along a longitudinal direction of said gas insulated main bus bar, each of said plurality of feeder units having one end connected to said gas insulated main bus bar and another end connected to an insulating terminal and including a circuit breaker, wherein:

a gas insulated bus-section-unit of a phase integral type is arranged on a portion of said gas insulated main bus bar of said substation equipment device;

said bus-section-unit has at least one bus-section-unit circuit breaker for each of three phases, each bus-section-unit circuit breaker having a first end and second end, and disconnecting switches respectively connected to each bus-section-unit circuit breaker at both ends of each bus-section-unit circuit breaker; and one end of said bus-section-unit is connected to said gas insulated main bus bar of said substation equipment device and another end of said bus-section-unit is provided with at least one external lead-out means for the three phases which is connectable to external connecting means of another substation equipment device provided at a location other than a location of said substation equipment device in which said gas insulated switchgear equipment device is included.

22. A gas insulated switchgear equipment device in a substation equipment device, said substation equipment device comprising first and second gas insulated main bus bars of three-phase integral type arranged in two parallel lines on an attachment surface, respectively, a bus-tie-unit of a three-phase integral type interconnecting said first and second gas insulated main bus bars and a plurality of feeder units of a three-phase integral type arranged along a longitudinal direction of said gas insulated main bus bar, each of said plurality of feeder units having one end connected to each of said gas insulated main bus bars and another end connected to an insulating terminal, wherein:
    first and second gas insulated bus-section-units of a three-phase integral type are arranged on a portion of each of said gas insulated main bus bars of said substation equipment device, respectively;
    each of said bus-section-units includes at least one bus-section-unit circuit breaker for each of three phases, each bus-section-unit circuit breaker having a first end and a second end, and disconnecting switches respectively connected to each bus-section-unit circuit breaker at both ends of each bus-section-unit circuit breaker; and
    one end of each of said bus-section-units is connected to a corresponding one of said first and second gas insulated main bus bars of said substation equipment device and another end of each of said bus-section-units is provided with at least one external lead-out means for the three phases which is connectable to external connecting means of another substation equipment device provided at a location other than a location of said substation equipment device in which said gas insulated switchgear equipment device is included.

23. A gas insulated switchgear equipment device according to claim 21 or claim 22, wherein each external lead-out means comprises a cable head connected to a cable.

24. A gas insulated switchgear equipment device according to claim 21 or claim 22, wherein each bus-section-unit is arranged on at least one end of each gas insulated main bus bar.

25. A gas insulated switchgear equipment device according to claim 21 or claim 22, wherein each bus-section-unit is arranged between feeder units situated in the longitudinal direction of each gas insulated main bus bar.

26. Gas insulated switchgear equipment comprising:
    a first gas insulated switchgear equipment device included in a first substation equipment device, said first substation equipment device comprising at least one first gas insulated main bus bar of a phase separated type arranged in a line on an attachment surface and a first plurality of feeder units of a phase separated type arranged along a longitudinal direction of said first gas insulated main bus bar, and each of said first plurality of feeder units having one end connected to an insulating terminal and including a circuit breaker;
    a second gas insulated switchgear equipment device included in a second substation equipment device, said second substation equipment device comprising at least one second gas insulated main bus bar of a phase separated type arranged in a line on an attachment surface and a second plurality of feeder units of a phase separated type arranged along a longitudinal direction of said second gas insulated main bus bar, and each of said second plurality of feeder units having one end connected to an insulating terminal and including a circuit breaker; and
    a gas insulated bus-section-unit of a phase separated type arranged on a portion of each gas insulated main bus bar of at least one of said substation equipment devices, respectively, wherein each bus-section-unit has at least one bus-section-unit circuit breaker having a first end and a second end and disconnecting switches connected to both ends of the bus-section-unit circuit breaker, and one end of each bus-section-unit is connected to a corresponding gas insulated main bus bar of the one substation equipment device and another end of each bus-section-unit is provided with at least one external lead-out means through which and through external connecting means each corresponding gas insulated main bus bar of the one of said substation equipment devices is connected to a gas insulated main bus bar of the other substation equipment device.

27. Gas insulated switchgear equipment comprising:
    a first gas insulated switchgear equipment device included in a first substation equipment device, said first substation equipment device comprising first and second gas insulated main bus bars of a phase separated type arranged in two parallel lines on a first attachment surface, respectively, a first bus-tie-unit interconnecting said first and second gas insulated main bus bars, and a first plurality of feeder units of a phase separated type arranged along longitudinal directions of said first and second gas insulated main bus bars, and each of said first plurality of feeder units having one end connected to each of said first and second gas insulated main bus bars and another end connected to an insulating terminal;
    a second gas insulated switchgear included in a second substation equipment device, said second substation equipment device comprising third and fourth gas insulated main bus bars of a phase separated type arranged in two parallel lines on a second attachment surface, respectively, a second bus-tie-unit interconnecting said third and fourth gas insulated main bus bars, and a second plurality of feeder units of a phase separated type arranged along longitudinal directions of said third and fourth gas insulated main bus bars, and each of said second plurality of feeder units having one end connected to each of said third and fourth gas insulated main bus bars and another end connected to an insulating terminal; and
    bus-section-units of a three phase integral type arranged on a portion main bus bar of at least one of said substation equipment devices, respectively, wherein each bus-section-unit is insulated by gas and has at least one bus-section-unit circuit breaker for each of three phases, each bus-section-unit circuit breaker having a first end and a second end, and disconnecting switches respectively connected to each bus-section-unit circuit breaker at both ends of each bus-section-unit circuit breaker, and one end of each bus-section-unit is connected to a corresponding one of said gas insulated main bus bars of the one of said substation equipment devices and another end of each bus-section-unit is provided with at least one external lead-out means through which and through external connecting means each corresponding gas insulated main bus bar of the one of said substation equipment devices is connected to a gas insulated main bus bar of the other substation equipment device.

28. Gas insulated switchgear equipment according to claim 26 or claim 27, wherein said gas insulated main bus bars of the one substation equipment device and the other substation equipment device are arranged in parallel to each other; said bus-section-units are positioned at equivalent positions on respective ones of said gas insulated main bus bars; and said substation equipment devices are interconnected through said external lead-out means and said external connecting means.

29. Gas insulated switchgear equipment according to claim 26 or claim 27, wherein said substation equipment devices are positioned on respective ones of said attachment surfaces at different positions; said bus-section-units are positioned on respective ones of said gas insulated main bus bars at different positions; and said substation equipment devices are interconnected through said external lead-out means and said external connecting means.

30. Gas insulated switchgear equipment comprising:
a first gas insulated switchgear equipment device included in a first substation equipment device, said first substation equipment device comprising at least one first gas insulated main bus bar of a three-phase integral type arranged in a line on a first attachment surface and a first plurality of feeder units of a three phase integral type arranged along a longitudinal direction of said first gas insulated main bus bar, and each of said first plurality of feeder units having one end connected to said first gas insulated main bus bar and another end connected to an insulating terminal and including a circuit breaker;
a second gas insulated switchgear equipment device included in a second substation equipment device, said second substation equipment device comprising at least one second gas insulated main bus bar of a three-phase integral type arranged in a line on a second attachment surface and a second plurality of feeder units of a three-phase integral type arranged along a longitudinal direction of said second gas insulated main bus bar, and each of said second plurality of feeder units having one end connected to said second gas insulated main bus bar and another end connected to an insulating terminal and including a circuit breaker; and
bus-section-units of a three-phase integral type arranged on a portion of each gas insulated main bus bar of at least one of said substation equipment devices, respectively, wherein each bus-section-unit is insulated by gas and has at least one bus-section-unit circuit breaker for each of three phases, each bus-section-unit circuit breaker having at first end and a second end, and disconnecting switches respectively connected to each bus-section-unit circuit breaker at both ends of each bus-section-unit circuit breaker, and one end of each bus-section-unit is connected to a corresponding one of said gas insulated main bus bars of the one of said substation equipment devices and another end of each bus-section-unit is provided with at least one external lead-out means for three phases through which and through external connecting means each corresponding gas insulated main bus bar of the one of said substation equipment devices is connected to a gas insulated main bus bar of the other substation equipment device.

31. Gas insulated switchgear equipment comprising:
a first gas insulated switchgear equipment device included in a first substation equipment device, said first substation equipment device comprising first and second gas insulated main bus bars of a three phase integral type arranged in two substantially parallel lines on a first attachment surface, respectively, a first bus-tie-unit of a three-phase integral type interconnecting said first and second gas insulated main bus bars, and a first plurality of feeder units of a three phase integral type arranged along longitudinal directions of said first and second gas insulated main bus bars, and each of said first plurality of feeder unit having one end connected to each of said first and second gas insulated main bus bars and another end including an insulating terminal;
a second gas insulated switchgear equipment device included in a second substation equipment device, said second substation equipment device comprising third and fourth gas insulated main bus bars of a three phase integral type arranged in two substantially parallel lines on a second detachment surface, respectively, a second bus-tie-unit of a three phase integral type interconnecting said third and fourth gas insulated main bus bars, and a second plurality of feeder units of a three phase integral type arranged along longitudinal directions of said third and fourth gas insulated main bus bars, and each of said second plurality of feeder units having one end connected to each of said third and fourth gas insulated main bus bars and another end including an insulating terminal; and
bus-section-units of a three phase integral type arranged on a portion of each gas insulated main bus bar of one of said substation equipment devices, respectively, wherein each bus-section-unit is insulated by gas and has at least one circuit breaker for each of three phases, each bus-section-unit having a first end and a second end, and disconnecting switches respectively connected to each bus-section-unit circuit breaker at both ends of each bus-section-unit circuit breaker, and one end of each bus-section-unit is connected to a corresponding one of said gas insulated main bus bars of the one of said substation equipment devices and another end of each bus-section-unit is provided with at least one external lead-out means through which and through external connecting means each corresponding gas insulated main bus bar of the one of said substation equipment devices is connected to a gas insulated main bus bar of the other substation equipment device.

32. Gas insulated switchgear equipment according to claim 30 or claim 31, wherein said gas insulated main bus bars of the one substation equipment device and the other substation equipment device are arranged in parallel to each other; said bus-section-units are positioned at equivalent positions on respective ones of said gas insulated main bus bars; and said substation equipment devices are interconnected through said external lead-out means and said external connecting means.

33. Gas insulated switchgear equipment according to claim 30 or claim 31, wherein said substation equipment devices are positioned on respective ones of said attachment surfaces at different positions; said bus-section-units are positioned on respective ones of said gas insulated main bus bars at different positions; and said substation equipment devices are interconnected through said external lead-out means and said external connecting means.

* * * * *